Oct. 8, 1946.          C. J. GLASSER          2,408,772
VARIABLE DENSITY FILTER ATTACHMENT FOR BINOCULARS
Filed Feb. 11, 1944          2 Sheets-Sheet 1

Inventor
Charles J. Glasser
BY
Thiess, Olson & Mecklenburger
Attorneys.

Oct. 8, 1946.  C. J. GLASSER .  2,408,772
VARIABLE DENSITY FILTER ATTACHMENT FOR BINOCULARS
Filed Feb. 11, 1944  2 Sheets-Sheet 2
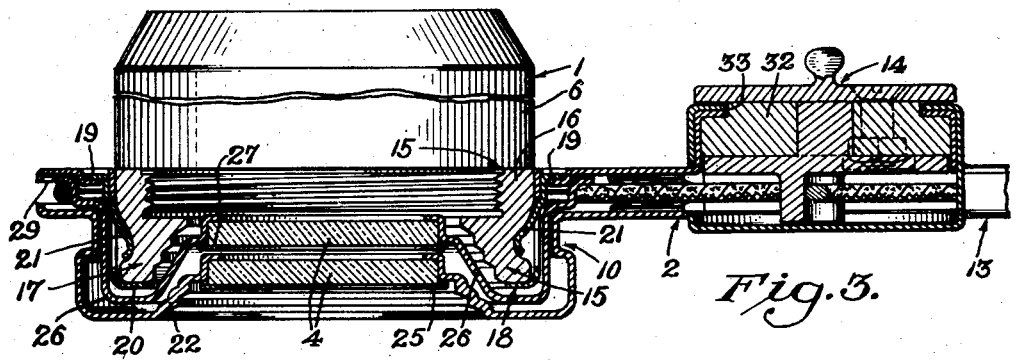
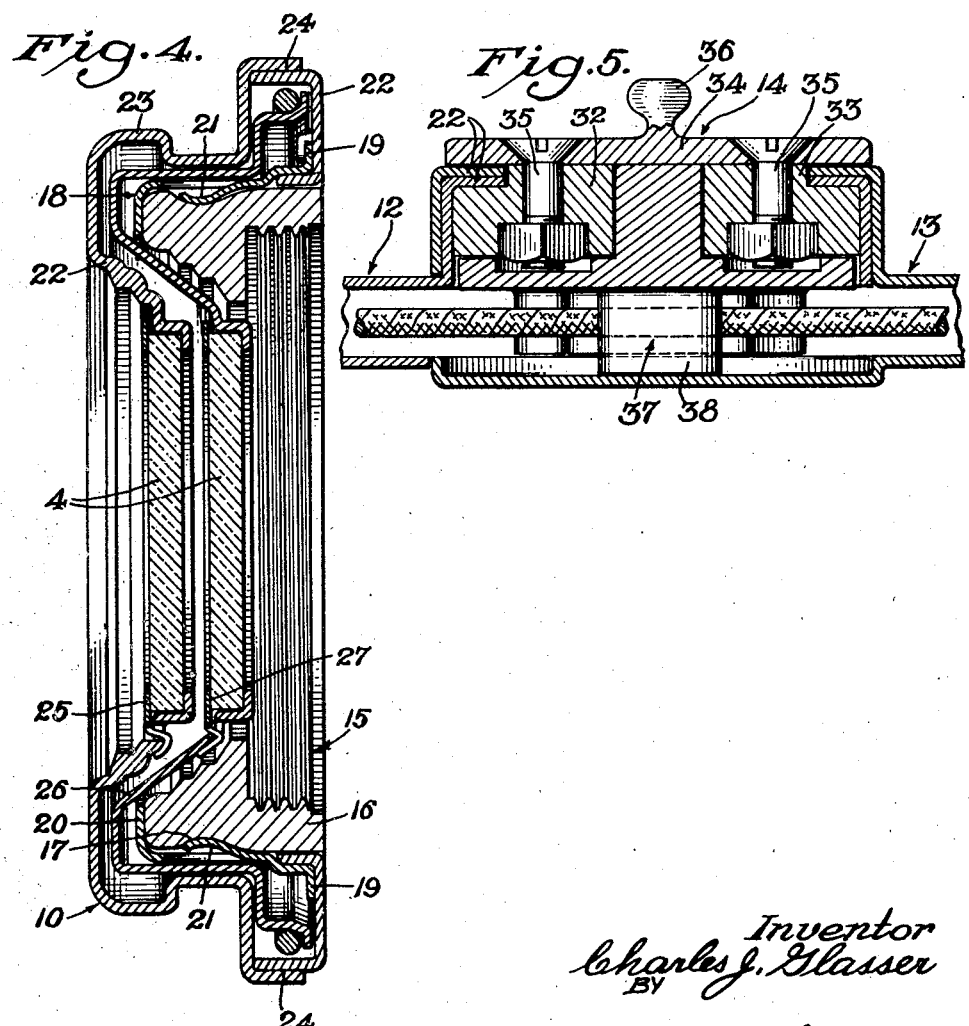

Patented Oct. 8, 1946

2,408,772

UNITED STATES PATENT OFFICE 2,408,772

VARIABLE DENSITY FILTER ATTACHMENT FOR BINOCULARS

Charles J. Glasser, Chicago, Ill.

Application February 11, 1944, Serial No. 521,899

7 Claims. (Cl. 88—34)

My invention relates to polarized lens binoculars.

One of the objects of my invention is to provide a polarized lens attachment for binoculars so constructed that the attachment may be applied to any one of a plurality of binoculars of different interpupillary distances.

Further objects and advantages of the invention will be apparent from the description and claims.

In the drawings, in which an embodiment of my invention is shown,

Fig. 3 is a section on the line 3—3 of Fig. 2;

Fig. 4 is a section on the line 4—4 of Fig. 2; and

Fig. 5 is a section on the line 5—5 of Fig. 2.

Figure 1:
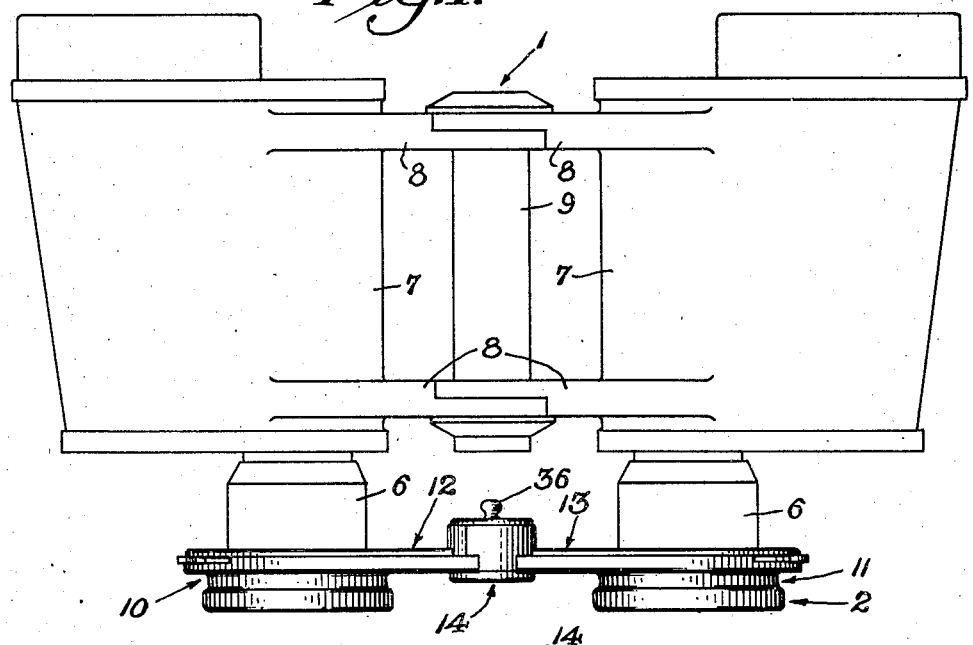
Figure 1 is a top plan view of a pair of binoculars with the polarized lens attachment applied thereto.

The construction shown comprises a pair of binoculars 1, which may be of any usual or suitable construction, and an attachment 2 to be applied thereto comprising two pairs of polarized lenses 4 and 5 positioned to lie in front of the rotarily adjustable eyepiece 6 of the binoculars when the attachment is applied. The binoculars comprise the usual two barrels 7 having hinge members 8 secured by means of a hinge pin 9 so that the barrels may swing toward and from each other to vary the interpupillary distance and the pair of focusing eyepieces 6 mounted to swing with the barrels, respectively.

The attachment comprises two generally circular shell members 10 and 11, in each of which a pair of polarizing lenses is mounted. These shell members have hinge extensions 12 and 13, respectively, which are pivotally secured together to provide a hinge connection at 14 between the two shells. The two shell members 10 and 11 are in general similar and symmetrical with respect to each other and the description of one is applicable to the other. The shell member 10 is attached to the eyepiece 6 by means of a connecting ring 15 which may be of plastic or any suitable material having a threaded portion 16 for threading onto the front of the eyepiece 6 and an annular grooved portion 17 for detachable swivel engagement with the mounting ring 18 for the shell 10. The mounting ring 18 is secured at 19 to the bottom of the shell 10 and has an inwardly-extending flange portion 20 for engagement with the front edge of the connecting ring 15 and a plurality of circumferentially-spaced leaf-spring tongues 21 struck up therefrom and extending inwardly for swivelling engagement with the annular groove 17 in the connecting ring 15.

Figure 2:
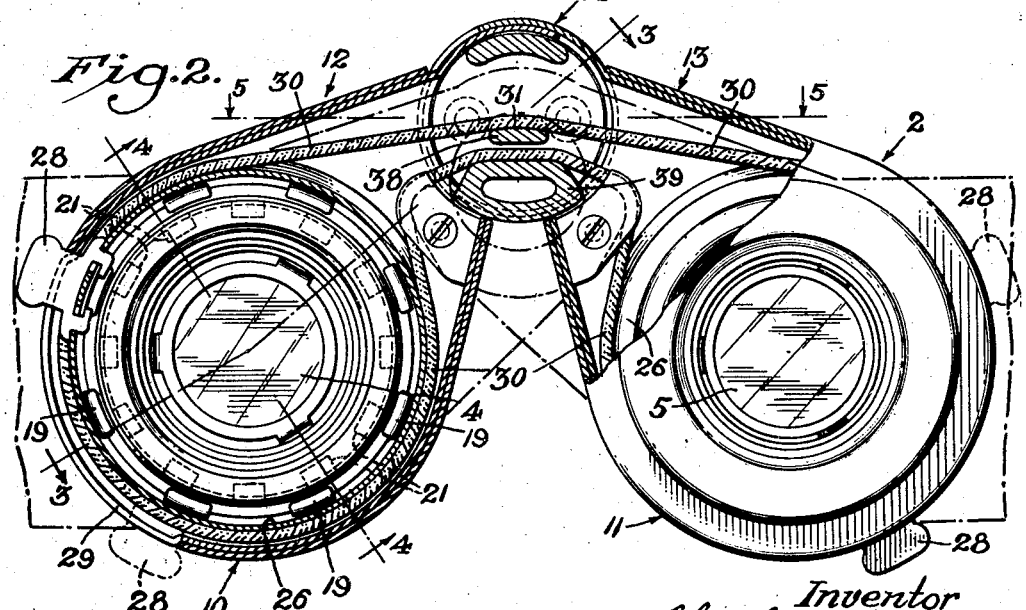
Fig. 2 is a front view of the polarized lens attachment, parts being broken away.

The shell 10 comprises the bottom or rear plate 22, which is secured to the mounting ring 18, and a front or cover 23 having a telescoping engagement with the rear plate 22 at 24. The rear plate 22 and cover 23 have portions extending radially from their circular portions, forming the hinge extension 12 which has a pivotal connection with the corresponding hinge connection 13 of the other shell, as shown in detail in Fig. 5. The cover member 23 of the shell has firmly and nonrotatably secured thereto the front polarizing lens 4 held in place against a flange on the cover by means of a mounting ring 25. Within the shell 10 is rotatably mounted a mounting ring 26 for the rear polarizing lens 4, which is secured to this mounting ring by means of a securing ring 27, as shown in Fig. 4. The relative rotative adjustment of the two lenses 4 will vary the amount of light transmitted therethrough as is well understood. It is desirable that the percentage of light transmitted through the two barrels should be maintained substantially constant in order to give the proper depth and perspective to the objects viewed. This object is accomplished by providing a cable transmission between the two rotatably mounted lenses 4 and 5 so that when one lens 4 is turned clockwise by the user, the other lens 5 will be turned clockwise automatically an amount corresponding to the adjustment of the first lens 4. As shown in Fig. 2, each rotatable lens mounting 26 is provided with a finger piece 28 which operates in an arcuate slot 29 in the shells 10 and 11 so that either of these finger pieces may be operated to effect a simultaneous adjustment of both of the rotatably mounted lens mountings 26. The mounting rings, backing member and cover may be of any suitable material such as sheet metal stampings. The cable transmission 30 between the two lenses may extend around the rotatable mounting rings 26 and pass over suitable guide means adjacent the axis 31 of hinge connection 14 between the two shells 10 and 11 so that the two shells may swing about their axis 31 without causing any rotary adjustment of the rotatable rear lenses with respect to the front fixed lenses.

The hinge connection between the two shells 10 and 11 comprises a hinge member 32 which may be of plastic or any suitable material having a reduced portion 33 extending through registering openings in the rear plates 22 of the two shells and a securing disc 34 between which and the hinge member 32 the two inwardly-extending annular flanges of the rear plates 22 are mounted. The hinge member 32 and securing member 34 are fastened together by means of bolts and nuts 35. The securing member is shown as provided with a glove button fastener 36, by means of which the attachment might be secured in a suitable enclosing case, not shown. The cord guide 37 is mounted in the central shell formed by the connection between the interengaging ends of the arms 12 and 13 of the shell members. This cord guide has an upper guide portion 38 over which the upper run of the cable 30 passes and a lower guide member 39 over which the lower run of the cable passes. These guides are so shaped and designed that swinging adjustment of the two shells 10 and 11 will not cause any relative rotation between the rotatable rear lenses and the front fixed lenses. With this construction, if the two adjustable lenses are originally mounted so that when a maximum of light is transmitted through the right-hand pair of lenses, the maximum amount of light will also be transmitted through the left-hand lenses, any adjustment thereafter of the right-hand lens to lessen the amount of light therethrough will automatically diminish proportionately the amount of light through the lefthand pair of lenses, and vice versa.

In use, the attachment can be applied to the binoculars by slipping the mounting rings 18 over the connecting rings 15 which are threaded onto the eyepieces 6 of the binoculars. The spring tongues 21 snap into the grooves 17 to hold the attachment firmly on the binoculars but allowing rotative movement of the connecting ring 15 with respect to the mounting ring 18. This enables the eyepieces 6 to be adjusted for focusing without disturbing or causing rotation of the mounting rings 18. The binoculars may be adjusted to vary the interpupillary distance by swinging the barrels about the hinge pin 9. This also is accomplished without causing any relative rotation between the front and rear polarized lenses 4 because of the design of the cable transmission 30 and associated parts. The rear rotatable polarized lenses may then be adjusted by means of one or the other of the finger pieces 28 to vary the amount of light transmitted.

The rotative adjustment of the focusing eyepieces 6 may be accomplished without disturbing the adjustment of the polarized lenses 4 and 5, due to the swivel connection between the ring 15 and the mounting ring 18.

Further modifications will be apparent to those skilled in the art and it is desired, therefore, that the invention be limited only by the scope of the appended claims.

Having thus described my invention, what I claim and desire to secure by Letters Patent is:

1. The combination with a pair of binoculars including two barrels connected to swing about a common axis for adjustment toward and from each other, of a polarizing lens set comprising two pairs of polarized lenses, one pair for each barrel and detachably connected with respect thereto mounted to swing about said axis with the barrel, the two lenses of each pair being juxtaposed, one lens being rotarily adjustable with respect to the other, and transmission means between said adjustable lenses whereby rotarily adjusting one lens of one pair will cause a corresponding rotary adjustment of a lens of the other pair, the connection between the barrels comprising a pair of hinge members, the mounting for the polarized lenses comprising a second pair of hinge members secured to said pairs of lenses, respectively, said hinge members having provisions to enable the axes of said hinge members to be offset with respect to each other when the lenses are mounted on the barrels whereby the lens set may be used selectively with different binoculars having different lengths of hinge members.

2. The combination with a pair of binoculars including two barrels connected to swing about a common axis for adjustment toward and from each other, of a polarizing lens set comprising two pairs of polarized lenses, one pair for each barrel and detachably connected with respect thereto mounted to swing about said axis with the barrel, the two lenses of each pair being juxtaposed, one lens being rotarily adjustable with respect to the other, and belt transmission means between said adjustable lenses whereby rotarily adjusting one lens of one pair will cause a corresponding rotary adjustment of a lens of the other pair, the connection between the barrels comprising a pair of hinge members, the mounting for the polarized lenses comprising a second pair of hinge members secured to said pairs of lenses, respectively, said hinge members having provisions to enable the axes of said hinge members to be offset with respect to each other when the lenses are mounted on the barrels whereby the lens set may be used selectively with different binoculars having different lengths of hinge members.

3. The combination with a pair of binoculars including two barrels connected to swing about a common axis for adjustment toward and from each other, of a polarizing lens set comprising two pairs of polarized lenses, one pair for each barrel and detachably connected with respect thereto mounted to swing about said axis with the barrel, the two lenses of each pair being juxtaposed, one lens being rotarily adjustable with respect to the other, belt transmission means between said adjustable lenses whereby rotarily adjusting one lens of one pair will cause a corresponding rotary adjustment of a lens of the other pair, the connection between the barrels comprising a pair of hinge members, the mounting for the polarized lenses comprising a second pair of hinge members secured to said pairs of lenses, respectively, said hinge members having provisions to enable the axes of said hinge members to be offset with respect to each other when the lenses are mounted on the barrels whereby the lens set may be used selectively with different binoculars having different lengths of hinge members, and guide means adjacent the axis of said second pair of hinge members for guiding said belt drive means.

4. The combination with a pair of binoculars including two barrels connected and mounted for adjustment toward and from each other and a pair of focusing eyepieces swiveled on said barrels, respectively, of a polarizing lens set comprising two pairs of polarized lenses, one pair for each barrel mounted to move toward and from each other with said barrels and detachably connected with respect thereto, the two lenses of each pair being juxtaposed, one lens being rotarily adjustable with respect to the other, and transmission means between said adjustable lenses whereby rotarily adjusting one lens of one pair will cause a corresponding rotary adjustment of a lens of the other pair, the connection between the barrels comprising a pair of hinge members, the mounting for the polarized lenses comprising a second pair of hinge members secured to said pairs of lenses, respectively, said hinge members having provisions to enable the axes of said hinge members to be offset with respect to each other when the lenses are mounted on the barrels whereby the lens set may be used selectively with different binoculars having different lengths of hinge members.

5. The combination with a pair of binoculars including two barrels connected and mounted for adjustment toward and from each other and a pair of focusing eyepieces swiveled on said barrels, respectively, of a polarizing lens set comprising two pairs of polarized lenses, one pair for each barrel mounted to move toward and from each other with said barrels, each pair being provided with a detachable swivel connection with its eyepiece to enable adjustment of the eyepiece indpendently of the pair of lenses the two lenses of each pair being juxtaposed, one lens being rotarily adjustable with respect to the other, and transmission means between said adjustable lenses whereby rotarily adjusting one lens of one pair will cause a corresponding rotary adjustment of a lens of the other pair, the connection between the barrels comprising a pair of hinge members, the mounting for the polarized lenses comprising a second pair of hinge members secured to said pairs of lenses, respectively, said hinge members having provisions to enable the axes of said hinge members to be offset with respect to each other when the lenses are mounted on the barrels whereby the lens set may be used selectively with different binoculars having different lengths of hinge members, one lens of each pair of lenses having a swivel connection with the eyepieces, respectively, whereby said eyepieces may be swivelly adjusted on the barrels without disturbing the adjustment of the lenses with respect to each other.

6. A polarizing apparatus for attachment to a pair of binoculars, said binoculars including two barrels connected and mounted for adjustment toward and from each other, said apparatus comprising two pairs of polarized lenses, one pair for each barrel to be mounted to move toward and from each other with said barrels, the two lenses of each pair being juxtaposed, one lens being rotarily adjustable with respect to the other, and transmission means between said adjustable lenses whereby rotarily adjusting one lens of one pair will cause a corresponding rotary adjustment of a lens of the other pair, the connection between the barrels comprising a pair of hinge members, the mounting for the polarized lenses comprising a second pair of hinge members secured to said pairs of lenses, respectively, said hinge members having provisions to enable the axes of said hinge members to be offset with respect to each other when the lenses are mounted on the barrels whereby the lens set may be used selectively with different binoculars having different lengths of hinge members.

7. A polarizing apparatus for attachment to a pair of binoculars, said binoculars including two barrels connected and mounted for adjustment toward and from each other and a pair of focusing eyepieces swiveled on said barrels, respectively, said apparatus comprising two pairs of polarized lenses, one pair for each barrel to be mounted to move toward and from each other with said barrels, the two lenses of each pair being juxtaposed, one lens being rotarily adjustable with respect to the other, and transmission means between said adjustable lenses whereby rotarily adjusting one lens of one pair will cause a corresponding rotary adjustment of a lens of the other pair, the connection between the barrels comprising a pair of hinge members, the mounting for the polarized lenses comprising a second pair of hinge members secured to said pairs of lenses, respectively, said hinge members having provisions to enable the axes of said hinge members to be offset with respect to each other when the lenses are mounted on the barrels whereby the lens set may be used selectively with different binoculars having different lengths of hinge members, each pair of lenses having a swivel connection with the eyepieces, respectively, whereby said eyepieces may be swivelly adjusted on the barrels without disturbing the adjustment of the lenses with respect to each other.

CHARLES J. GLASSER.